United States Patent
Morimoto

(10) Patent No.: US 8,365,432 B2
(45) Date of Patent: Feb. 5, 2013

(54) FREEZE-DRYING METHOD AND FREEZE-DRYING APPARATUS

(75) Inventor: Shuji Morimoto, Suita (JP)

(73) Assignees: Morimoto-Pharma Co., Ltd., Suita-shi (JP); Unitec Co., Ltd., Osaka-shi (JP); Pharma-Tech Co., Ltd., Suita-shi (JP)

( * ) Notice: Subject to any disclaimer, the term of this patent is extended or adjusted under 35 U.S.C. 154(b) by 379 days.

(21) Appl. No.: 12/933,225

(22) PCT Filed: Mar. 19, 2008

(86) PCT No.: PCT/JP2008/055057
§ 371 (c)(1),
(2), (4) Date: Sep. 17, 2010

(87) PCT Pub. No.: WO2009/116145
PCT Pub. Date: Sep. 24, 2009

(65) Prior Publication Data
US 2011/0016741 A1    Jan. 27, 2011

(51) Int. Cl.
*F26B 5/06*    (2006.01)
(52) U.S. Cl. .......... 34/287; 62/533; 435/289.5; 424/489
(58) Field of Classification Search ............... 34/284, 34/287, 90, 92, 138; 62/50.1, 50.7, 533; 424/489; 435/287.5
See application file for complete search history.

(56) References Cited

U.S. PATENT DOCUMENTS

| | | | | |
|---|---|---|---|---|
| 3,883,958 A | * | 5/1975 | Filipe | 34/289 |
| 4,033,048 A | * | 7/1977 | Van Ike | 34/92 |
| 4,327,750 A | * | 5/1982 | Glock | 131/292 |
| 4,455,135 A | * | 6/1984 | Bitterly | 432/1 |
| 5,964,043 A | * | 10/1999 | Oughton et al. | 34/92 |

(Continued)

FOREIGN PATENT DOCUMENTS

FR    2607129 A1 *  5/1988
JP    06042867 A *  2/1994

(Continued)

*Primary Examiner* — Stephen M. Gravini
(74) *Attorney, Agent, or Firm* — Rankin, Hill & Clark LLP

(57) ABSTRACT

A material to be dried is frozen and is efficiently freeze-dried in a short time, thereby increasing production efficiency. A freeze-drying apparatus includes a vertical tube (2) having an inner circumferential surface formed with a frozen surface (2a), a liquid-supply device (5) for supplying a liquid material to be dried (47) onto the frozen surface (2a), a freezing device (10) arranged around the vertical tube (2) and intended for cooling the frozen surface (2a), a pressure-reduction device (12) which puts an interior area of the vertical tube (2) into a state of vacuum, and an internal heating device (41) in the vertical tube (2). The internal heating device (41) is arranged in the vertical tube (2) along a center axis thereof, and has an outer surface formed with a vertically long circular-cylindrical radiation surface (43). The liquid material to be dried (47) supplied from the liquid-supply device (5) is sprinkled onto the frozen surface (2a), and the frozen surface (2a) is cooled to freeze the dried material (47) into a shape of a pipe. Then, the interior area of the vertical tube (2) is pressure-reduced to supply radiation heat from the internal heating device (41) to the dried material (47) for freeze-drying the dried material (47).

4 Claims, 3 Drawing Sheets

U.S. PATENT DOCUMENTS

| | | | |
|---|---|---|---|
| 2009/0205363 A1* | 8/2009 | de Strulle | 62/533 |
| 2009/0221059 A1* | 9/2009 | Williams et al. | 435/287.2 |
| 2010/0251560 A1* | 10/2010 | Thomas et al. | 34/284 |
| 2010/0298738 A1* | 11/2010 | Felts et al. | 600/576 |
| 2010/0303918 A1* | 12/2010 | Watson et al. | 424/489 |
| 2011/0016741 A1* | 1/2011 | Morimoto | 34/284 |
| 2011/0071612 A1* | 3/2011 | Hunter et al. | 623/1.2 |

FOREIGN PATENT DOCUMENTS

| | | |
|---|---|---|
| JP | 2002-310556 | 10/2002 |
| JP | 2003-010722 | 1/2003 |
| JP | 2003194459 A * | 7/2003 |
| JP | 2004-330130 | 11/2004 |
| JP | 2008-020151 | 1/2008 |
| WO | WO 2009006891 A1 * | 1/2009 |

\* cited by examiner

FREEZE-DRYING METHOD AND FREEZE-DRYING APPARATUS

TECHNICAL FIELD

The present invention relates to a freeze-drying method and a freeze-drying apparatus for freezing a liquid material to be dried such as liquid medicine onto an inner circumferential surface of a vertical tube and then freeze-drying the frozen dried material, and more particularly relates to a freeze-drying method and a freeze-drying apparatus capable of freezing the material to be dried and then efficiently freeze-drying the frozen dried material in a short time, thereby significantly increasing production efficiency.

BACKGROUND ART

A conventional example of the methods for efficiently freeze-drying a liquid material to be dried such as an aqueous solution of pharmaceutical includes a method of supplying the material to be dried onto an inner circumferential surface of a vertical tube and freezing the dried material, and freeze-drying the frozen dried material under reduced pressure (for example, see Patent Document 1).

The conventional technique includes a vertical tube, liquid-supply means for supplying a liquid material to be dried to spray means provided at an upper portion of the vertical tube, a liquid-recovery passage connected to a lower portion of the vertical tube so as to recover excessive dried material, and freezing means arranged around the vertical tube so as to control a temperature of an inner circumferential surface of the vertical tube.

The liquid dried material supplied from the liquid-supply means is sprinkled and supplied onto the inner circumferential surface of the vertical tube by the spray means. The inner circumferential surface of the vertical tube is formed with a frozen surface which is cooled by the freezing means to thereby freeze the dried material onto the frozen surface into a shape of a pipe. At this time, the excessive dried material that has flowed down to the lower portion of the vertical tube is recovered to the liquid-supply means via the liquid-recovery passage. When a predetermined amount of the dried material has been supplied, the supply of the dried material from the liquid-supply means is stopped, and the pressure within the vertical tube is reduced. Then the freezing means is switched to heating means by increasing its cooling medium temperature, and the heating means adds sublimation heat to the frozen dried material, thereby enabling the frozen dried material to be freeze-dried.

The vertical tube has a lower end portion, to which a flange with a nozzle is assembled. The flange incorporates a jet nozzle. If the dried material within the vertical tube is freeze-dried into the shape of a pipe, the dried material is scraped off from the frozen surface, received by the flange with a nozzle, and roughly crushed by air injected out of the jet nozzle. The roughly crushed dried material is transported by the air to a jet mill to be crushed into a more fine powder state. Thereafter, a cyclone device captures and collects the fine powder, which is recovered into a bulk can or the like.

Patent Document 1: Japanese Patent Laid-open Publication No. 2004-330130

DISCLOSURE OF THE INVENTION

Problems to be Solved by the Invention

The above conventional technique switches the freezing means to the heating means by heating its cooling medium to, e.g., 30° C. to 50° C. and heats the frozen dried material via a wall portion of the vertical tube by the heating means. Therefore, the conventional technique is required to significantly change the temperature of the cooling medium between a freezing process and a freeze-drying process, and the temperature control is not easy. This causes the following problems, and since a long time is necessary for freeze-drying, it is not easy to increase productivity.

(1) Heat supplied from the heating means is transmitted as conductive heat via the wall portion of the vertical tube. Since the vertical tube is formed into a large shape, the vertical tube easily absorbs much of the amount of heat, and thus it is not easy to increase heating efficiency.

(2) Moreover, a frozen-water content in the dried material is sublimated from an inner surface side facing a pressure-reduced space in the vertical tube, and the sublimation heat is supplied from the heating means. As the amount of supplied heat is transmitted through the frozen dried material, it is not easy to efficiently and rapidly heat the frozen dried material.

(3) In order that the dried material can be easily scraped off from the inner circumferential surface of the vertical tube after drying, typically, only a water content is first supplied onto the frozen surface to form a so-called ice lining. For this reason, when heat is transmitted from the heating means via the wall portion of the vertical tube, there is a fear that the ice lining is heated, sublimated, and disappears before the water content in the dried material is sublimated. When the ice lining disappears, the inner circumferential surface of the vertical tube and the frozen dried material are only partially brought into contact with each other, resulting in a problem that the transmission efficiency of the conductive heat from the inner circumferential surface of the vertical tube to the dried material is extremely lowered.

The present invention has a technical object to solve the above-mentioned problems and provide a freeze-drying method and a freeze-drying apparatus capable of freezing a material to be dried and then efficiently supplying sublimation heat to freeze-dry the frozen dried material in a short time, thereby significantly increasing production efficiency.

Means for Solving the Problems

In order to solve the above problems, the present invention is constructed as follows, if it is described with reference to FIGS. 1 to 3 showing an embodiment of the present invention.

That is, a first aspect of the present invention is directed to a freeze-drying method including: supplying a liquid material to be dried (47) from liquid-supply means (5) onto a frozen surface (2a) formed on an inner circumferential surface of a vertical tube (2); cooling the frozen surface (2a) to freeze the dried material (47) into a pipe-shape; subsequently stopping the supply of the dried material (47) from the liquid-supply means (5); and then reducing a pressure within the vertical tube (2) to freeze-dry the frozen dried material (47), wherein upon the freeze-drying, radiation heat is supplied from internal heating means (41) arranged in the vertical tube (2) to the frozen dried material (47).

A second aspect of the present invention concerns a freeze-drying apparatus which includes a vertical tube (2) having an inner circumferential surface formed with a frozen surface (2a), liquid-supply means (5) for supplying a liquid material to be dried (47) onto the frozen surface (2a), freezing means (10) arranged around the vertical tube (2) and intended for cooling the frozen surface (2a), and pressure-reduction means (12) which puts an interior area of the vertical tube (2) into a state of vacuum, wherein the vertical tube (2) has internal heating means (41) therein, and the internal heating means (41) is capable of supplying radiation heat onto the frozen surface (2a) side.

The liquid material to be dried which has been supplied onto the frozen surface formed on the inner circumferential surface of the vertical tube is frozen by cooling the frozen surface by the freezing means and is formed into a frozen layer. Then the supply of the liquid material to be dried is stopped to put the interior area of the vertical tube into a state of vacuum by the pressure-reduction means so that a frozen-water content contained in the frozen layer of the dried material is sublimated. Radiation heat from the internal heating means is supplied onto the frozen layer on an inner surface side of the frozen layer facing an inner space of the vertical tube. This allows sublimation heat taken away from the frozen layer at the time of the sublimation to be supplied, so that the frozen-water content contained in the frozen layer is continuously sublimated to dry the dried material.

The internal heating means is not limited to a particular shape and configuration and the type of a heat source. For example, the internal heating means can be formed in a helical shape. However, when the internal heating means is arranged in the vertical tube along its center axis so as to be formed into a shape having an outer surface provided with a vertically long radiation surface, radiation heat is easily and uniformly supplied onto the inner surface of the frozen dried material. In particular, the radiation surface is formed into a circular-cylindrical shape, which is more preferable because radiation heat can be supplied more uniformly.

The radiation surface is preferably close to the dried material in the range not affecting the freezing of the dried material and the sublimation of the frozen-water content, and therefore, the internal heating means is preferably formed into a large shape. In this case, as the inner space of the vertical tube becomes smaller, there is an advantage that the interior area of the vertical tube can be easily put into a state of vacuum by the pressure-reduction means to maintain this state.

The radiation surface can be subjected to a surface treatment for the quality of the material and color having high radiation efficiency of radiation heat in the range not affecting the dried material. In addition, as a heat source of the heating means for heating the radiation surface, for example, an electric heater can be used, but the use of a heating medium such as warm water, hot water, and heating steam can preferably easily perform control to a predetermined temperature.

A temperature of the radiation surface heated by the heat source is set according to a balance between the amount of radiation heat supplied to the dried material and the amount of sublimation heat taken away from the dried material. Specifically, depending on the radiation area and the radiation efficiency of the radiation surface, the heat reception efficiency of the dried material, and the amount of sublimation heat generated by pressure reduction, it is set to a temperature at which the frozen-water content contained in the dried material is rapidly sublimated without being melted by radiation heat, e.g., to 20 to 150° C., preferably, 30 to 100° C., more preferably, 40 to 90° C. Further, a temperature sensor may be arranged in the vertical tube to measure a temperature of the dried material which has received radiation heat, and the temperature of the internal heating means may be controlled based on the measured temperature so as not to increase up to a glass transition temperature or more of the frozen-water content.

The sublimation heat may be supplied only from the internal heating means, however, in the present invention, external heating means different from the freezing means or external heating means serving as the freezing means may be provided on an outer surface of the vertical tube. In addition to radiation from the internal heating means, conductive heat is supplied from the external heating means so that sublimation heat taken away from the frozen layer can be supplied more rapidly, thereby enabling freeze-drying in a shorter time.

When the freezing means serves as the external heating means, the temperature of the cooling medium which circulates through the freezing means can be controlled by switching between a predetermined freezing temperature and heating temperature.

Although the vertical tube is not limited to those of a specific dimension, as the dried material freeze-dried within the vertical tube has a cross-sectional shape of a larger outer dimension, the processing amount in one-time freeze-drying can be increased. For this reason, the cross-sectional shape of the vertical tube has an inner dimension set preferably to at least 100 mm in testing equipment and to at least 200 mm in manufacturing equipment, more preferably to at least 300 mm, still more preferably to at least 400 mm. Here, the vertical tube has a cross section ordinarily shaped in a circle and the inner dimension refers to an inner diameter. However, the cross section may have a polygonal or any other shape. If the cross sectional shape is polygonal, the inner dimension refers to a length of a diagonal line.

The frozen thickness of the dried material frozen into a pipe-shape within the vertical tube is sufficient if the freeze-dried product can be crushed by the roughly crushing means and therefore it is not limited to a specific dimension. However, as the frozen thickness is smaller, the more easily the freeze-dried product can be roughly crushed after being freeze-dried. Accordingly, the thickness is preferably set to not more than 25 mm, more preferably to not more than 15 mm, and still more preferably to not more than 10 mm.

Effects of the Invention

Since the present invention is constituted and functions as mentioned above, the following effects are obtained.

(1) As the internal heating means is arranged in the vertical tube and is just heated to a predetermined temperature, the internal heating means need not serve as the freezing means, and the temperature control is easy.

(2) As the interior area of the vertical tube is in a state of vacuum, there is no convected heat from the internal heating means, and as the vertical tube is contacted with nothing other than piping, the amount of wastefully consumed conductive heat is very small and substantially the entire released radiation heat is received by the dried material, which can increase heating efficiency.

(3) Although the frozen-water content in the dried material is sublimated from its inner surface side facing the pressure-reduced space in the vertical tube, radiation heat released from the internal heating means is directly supplied onto the inner side surface of the dried material so that sublimation heat can be supplied efficiently and rapidly by radiation from the internal heating means. In addition, since radiation heat is directly supplied from the internal heating means to the dried material, even if an ice lining formed on the inner surface of the vertical tube disappears at an early stage, it will not cause the heat transmission efficiency from the internal heating means to be lowered.

As described above, after the dried material is frozen, the dried material can be efficiently freeze-dried in a short time, and production efficiency can be significantly increased.

(4) Further, as the internal heating means is arranged in the vertical tube, the inner space of the vertical tube becomes smaller by the volume of the internal heating means. In particular, when the inner diameter of the vertical tube is increased, the internal heating means is accordingly formed into a large shape so that the space in the vertical tube can be smaller. This allows the interior area of the vertical tube to be rapidly put into a state of vacuum by the pressure-reduction means so that the frozen dried material can be efficiently freeze-dried.

DESCRIPTION OF REFERENCE SIGNS

1 . . . Freeze-drying apparatus
2 . . . Vertical tube
2a . . . Frozen surface
5 . . . Liquid-supply means (liquid-supply device)
10 . . . Freezing means (freezing device)
12 . . . Pressure-reduction means (pressure-reduction device)
41 . . . Internal heating means (internal heating device)
43 . . . Radiation surface
47 . . . Material to be dried

BEST MODE FOR CARRYING OUT THE INVENTION

Hereinafter, an embodiment of the present invention will be described with reference to the drawings.

Figure 1:
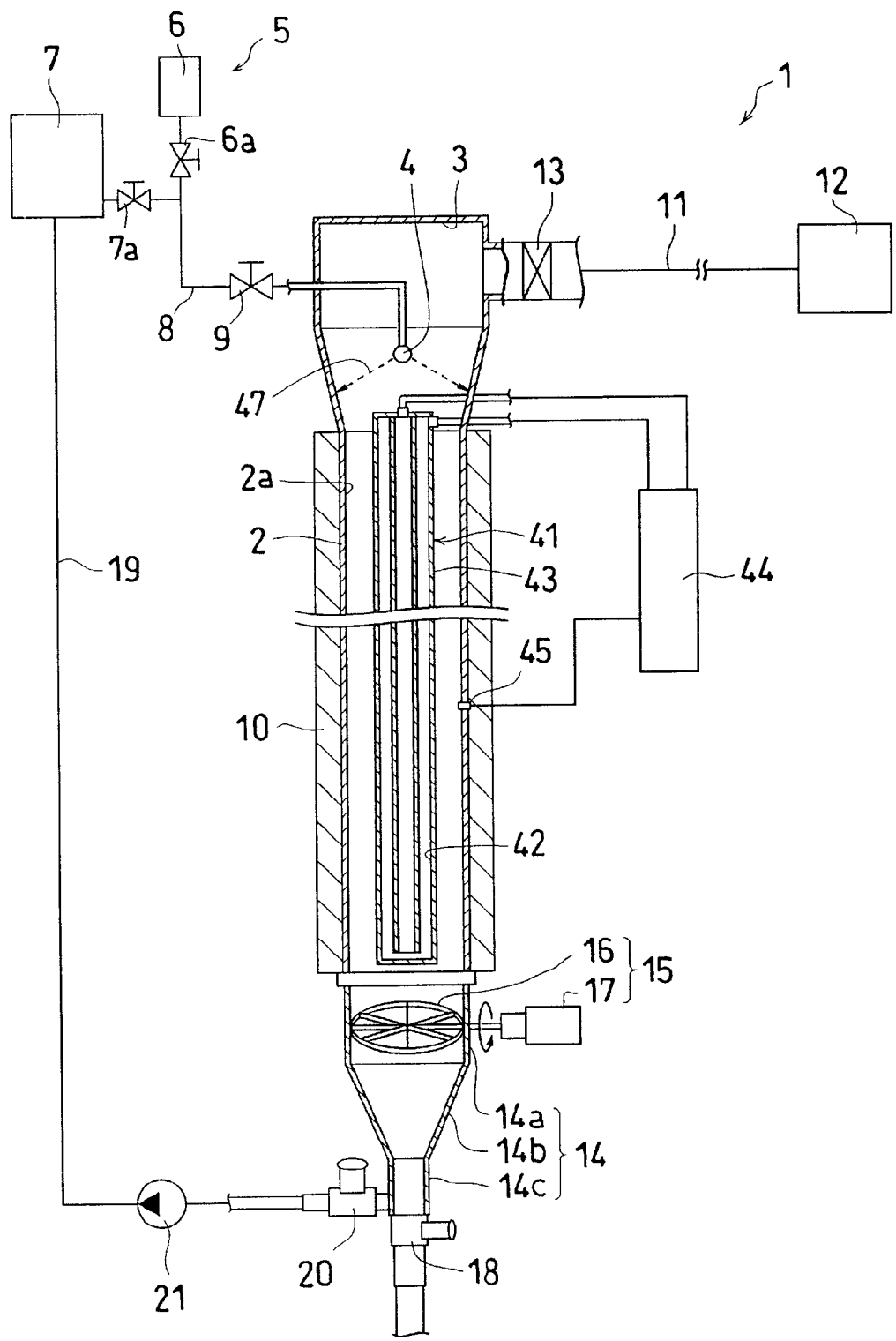
FIG. 1 is a schematic structural view of a freeze-drying apparatus showing an embodiment of the present invention.
Figure 2:
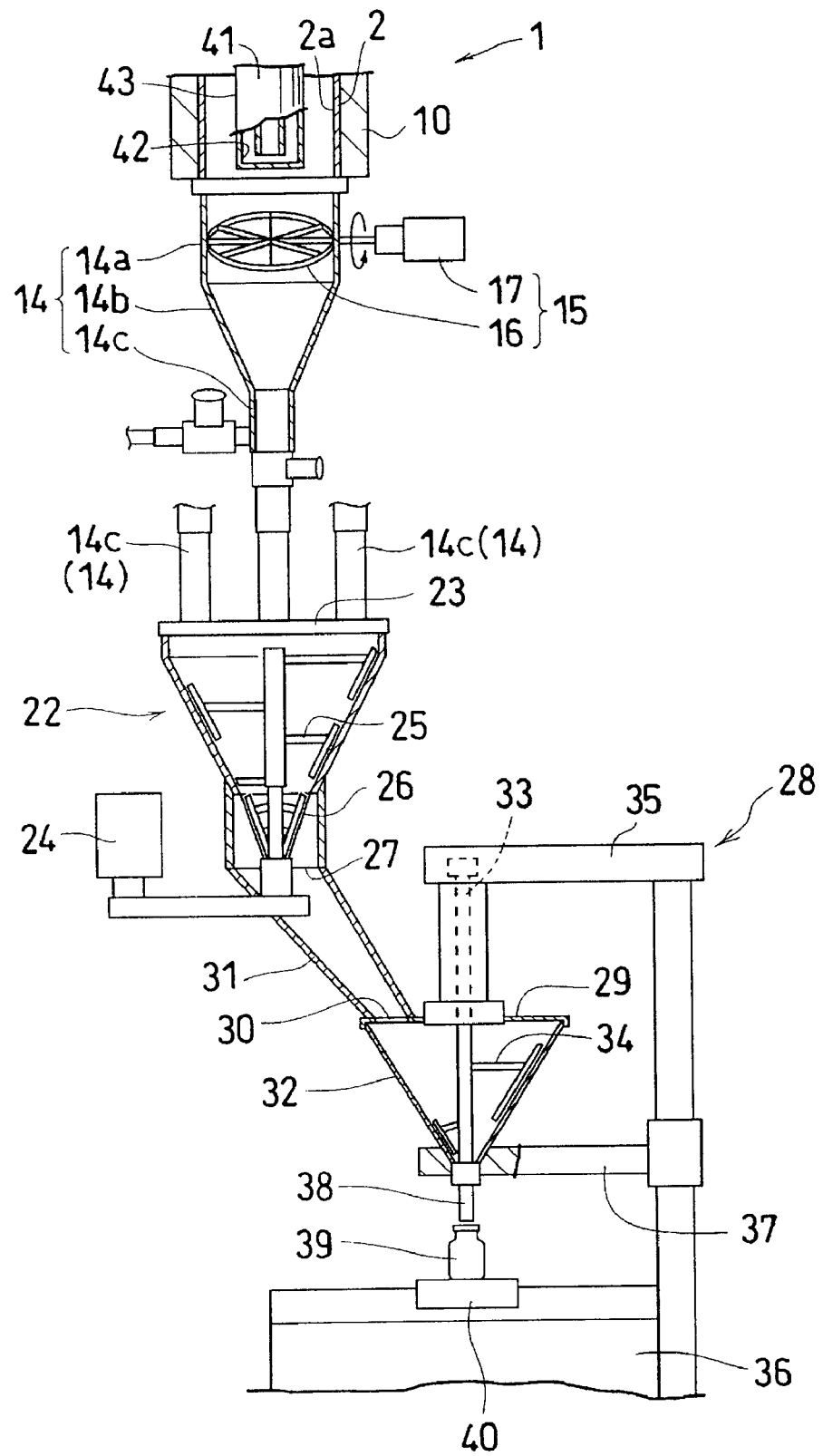
FIG. 2 is a schematic structural view of a crushing-granulating device and a powder filling device connected to the freeze-drying apparatus of the embodiment of the present invention.
Figure 3:
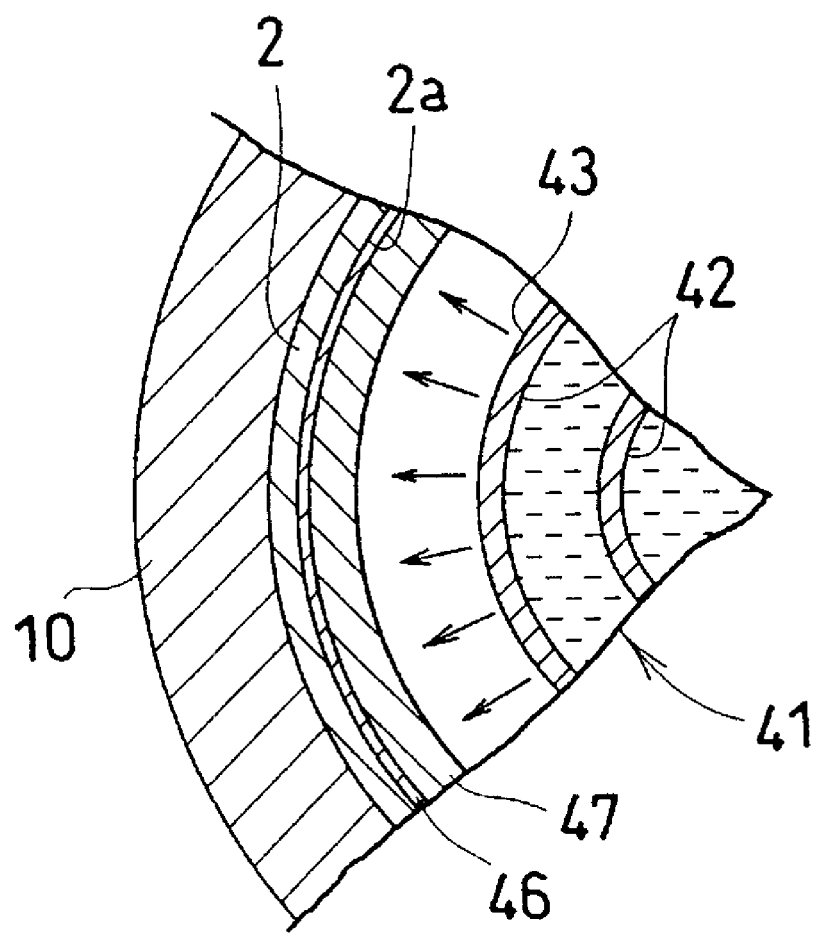
FIG. 3 is a cross-sectional plan view of an essential part of a vertical tube of the embodiment of the present invention.

FIGS. 1 to 3 show the embodiment of the present invention. FIG. 1 is a schematic structural view of a freeze-drying apparatus of the present invention, FIG. 2 is a schematic structural view of a crushing-granulating device and a powder filling device connected to the freeze-drying apparatus, and FIG. 3 is a cross-sectional plan view of an essential part of a vertical tube at the time of freeze-drying.

As shown in FIG. 1, a freeze-drying apparatus (1) includes a circular-cylindrical vertical tube (2), and an air-tight chamber (3) is formed at an upper portion of the circular-cylindrical vertical tube (2). Although this vertical tube (2) is not limited to a specific dimension, an inner diameter thereof is formed to be, for example, at least 200 mm, preferably within a range of 300 mm to 600 mm, more preferably within a range of 400 mm to 600 mm. Further, the vertical tube (2) is formed to have a height of 500 mm to 4000 mm, preferably 1000 mm to 3000 mm.

A spray device (4) is arranged within the air-tight chamber (3). The spray device (4) is connected to a purified-water tank (6) and a liquid-supply tank (7) of a liquid-supply device (5) via a liquid-supply passage (8). The liquid-supply tank (7) contains liquid material to be dried, for example, such as aqueous solution of pharmaceutical product. The liquid-supply passage (8) is additionally provided with a liquid-supply valve (9). This liquid-supply valve (9) and a take-out valve (6a) of the purified-water tank (6) are opened to supply the purified water to the spray device (4) from which the purified water is sprinkled within the air-tight chamber (3). This liquid-supply valve (9) and a take-out valve (7a) of the liquid-supply tank (7) are opened to feed the dried material (47) to the spray device (4) from which the dried material is sprayed within the air-tight chamber (3).

A frozen surface (2a) is formed on an inner circumferential surface of the vertical tube (2), whereas a freezing device (10) serving as an external heating device is arranged around the vertical tube (2). The freezing device (10) controls the frozen surface (2a) to a predetermined temperature lower than, for example, a freezing temperature of the dried material (47). The air-tight chamber (3) is connected to a pressure-reduction device (12) through a pressure-reduction passage (11), and a pressure-reduction passage open-close valve (13) is provided in the pressure-reduction passage (11). When the pressure-reduction passage open-close valve (13) is opened to drive the pressure-reduction device (12), the vertical tube (2) has its interior area vacuumed.

An internal heating device (41) is arranged in the vertical tube (2) along its center axis. The internal heating device (41) has an internal-external double-pipe construction, and is formed in its inside with a heating medium flow passage (42). The internal heating device (41) has an outer circumferential surface formed with a vertically long circular-cylindrical radiation surface (43) which faces the frozen surface (2*a*). The radiation surface (43) is heated by circulating a heating medium such as warm water, hot water, or heating steam through the heating medium flow passage (42), thereby releasing radiation heat from the radiation surface (43) onto the frozen surface (2*a*). The heating medium flow passage (42) is connected to a temperature controller (44) arranged outside the vertical tube (2) so that the heating medium flowing through the heating medium flow passage (42) is controlled to a predetermined temperature based on a detection temperature from a temperature sensor (45) arranged in the vertical tube (2).

A vertical guide cylinder (14) is connected to a lower end portion of the vertical tube (2). The guide cylinder (14) includes an upper portion (14*a*) of a larger diameter, a mid portion (14*b*) of a diameter decreasing progressively downwards, and a lower portion (14*c*) of a smaller diameter. A roughly crushing device (15) has a rotating blade (16) arranged within the larger-diameter portion (14*a*). The rotating blade (16) is rotated by a motor (17). Further, the smaller-diameter portion (14*c*) is additionally provided with a first open-close valve (18).

Further, it suffices if the decreasing diameter portion (14*b*) has an inner surface inclined to such an extent that the roughly crushed product does not stay. However, the closer to the vertical plane, the longer the vertical length will be. Accordingly, the inclination is set to, for example, 60 to 80 degrees, and more preferably 70 to 80 degrees with respect to the horizontal plane.

Branched off above the first open-close valve (18) is a liquid-recovery passage (19), and the liquid-recovery passage (19) is additionally provided with a second open-close valve (20) and a recovery pump (21). The liquid-recovery passage (19) is connected to the liquid-supply tank (7), and the excessive dried material that has flowed down within the vertical tube (2) is returned to the liquid-supply tank (7) via the liquid-recovery passage (19) by the recovery pump (21).

As shown in FIG. 2, the guide cylinder (14) has a lower end connected to an upper cover (23) of a crushing-granulating device (22). The crushing-granulating device (22) has, in its inside portion, a crushing arm (25) which is rotated by a crushing motor (24), and a screen (26) of a predetermined mesh additionally provided at its lower portion.

Further, three guide cylinders (14 . . . ) are connected to the upper cover (23), and the vertical tube (2) is connected to an upper portion of each of the guide cylinders (14). However, the vertical tube (2) connected to the upper cover (23) in the present invention is set in view of a balance between the freeze-drying speed and the filling speed of a powder filling device to be mentioned later, and the number may be one or two, or may be at least four.

The powder filling device (28) is arranged below a take-out port (27) of the crushing-granulating device (22), and this powder filling device (28) has an upper cover (29) opened to provide a throw-in port (30). This throw-in port (30) and the take-out port (27) are connected to each other through a second guide cylinder (31). The powder filling device (28) includes a funnel (32) within which an auger screw (33) is disposed vertically, the auger screw (33) being additionally provided with an agitating arm (34). The auger screw (33) is supported by a support pedestal (36) through a support arm (35) and is intermittently driven for rotation by a not-shown transmission mechanism. The funnel (32) is supported by the support arm (35) and an auxiliary arm (37) disposed therebelow. This funnel (32) has a lower portion to which a metering portion (38) is additionally attached, and below the metering portion (38), a carry-in and carry-out portion (40) for a predetermined container (39) such as a vial is provided.

Next, operation procedures of the freeze-drying apparatus (1) will be described.

First, the vertical tube (2) has the frozen surface (2a) cooled to below the freezing point by the freezing device (10). With the pressure-reduction passage open-close valve (13) and the first open-close valve (18) closed, the take-out valve (6a) of the purified-water tank (6) and the liquid-supply valve (9) are opened, thereby enabling the purified water to be fed to the spray device (4) through which it is sprinkled within the air-tight chamber (3) and to flow down along the frozen surface (2a) to freeze thereonto, thereby forming a so-called ice lining (46), as shown in FIG. 3.

After a predetermined amount of purified water is supplied so that the thickness of the ice lining (46) is about 1 to 2 mm, the take-out valve (6a) of the purified-water tank (6) is closed but the take-out valve (7a) of the liquid-supply tank (7) is opened. This allows the liquid dried material (47) to be supplied from the liquid-supply tank (7) to the spray device (4) through which it is sprinkled within the air-tight chamber (3) and to flow down along the ice lining (46) on the frozen surface (2a), and as shown in FIG. 3, the dried material (47) is frozen in a pipe shape on the ice lining (46). At this time, the excessive dried material that has flowed down to the lower end of the vertical tube (2) is recovered from the recovery pump (21) through the second open-close valve (20) and the liquid-recovery passage (19) to the liquid-supply tank (7).

Further, the purified water and the dried material (47) are sprinkled from the spray device (4) toward the inner surface of the air-tight chamber (3) so as not to be sprinkled onto the internal heating device (41).

After the supply of a predetermined amount of the dried material is completed, the take-out valve (7a) and the liquid-supply valve (9) are closed to stop sprinkling from the spray device (4). After the excessive dried material that has flowed down to the lower end of the vertical tube (2) is recovered from the liquid-recovery passage (19) to the liquid-supply tank (7), the second open-close valve (20) is closed. Subsequently, the pressure-reduction passage open-close valve (13) is opened to drive the pressure-reduction device (12) so as to retain the interior area of the vertical tube (2) to a predetermined degree of vacuum. This allows a frozen-water content contained in the dried material to be sublimated, and its water vapor is discharged from the pressure-reduction passage (11) so as to be collected to a not-shown cold trap.

A heating medium at a predetermined temperature is circulated into the internal heating device (41), and as shown in FIG. 3, radiation heat is released from the radiation surface (43). As the radiation surface (43) faces the frozen surface (2a), the radiation heat is supplied onto the inner circumferential surface side of the dried material (47) frozen on the frozen surface (2a) facing a pressure-reduced space. At this time, as the radiation surface (43) is formed in a circular-cylindrical shape, the radiation heat is supplied from the radiation surface (43) to the dried material (47) substantially uniformly.

The freezing device (10) is switched to the external heating device, a cooling medium of the freezing device (10) is heated to a predetermined temperature such as 30° C., and conductive heat is supplied from the freezing device (10) onto the peripheral wall frozen surface (2a) of the vertical tube (2). Sublimation heat taken away from the dried material by sublimation of the frozen-water content is rapidly supplied by the radiation heat and the conductive heat, so that the frozen-water content contained in the dried material is continuously sublimated to freeze-dry the dried material to have a water content of e.g., 0.1 to 5% by weight. Thereafter, when the water content sublimated is reduced, the amount of sublimation heat taken away is also reduced so that a product temperature of the dried material rises. The product temperature is held below the temperature not affecting the quality of the dried material, such as 40° C. or below, and by heating the dried material under reduced pressure, the water content remaining in the dried material, such as bound water, is vaporized, and the dried material is sufficiently dried until the water content in the dried material is e.g., 0.1% by weight or less. The water content in the dried material after drying is illustrated by way of example, and the water content in the dried material obtained by drying of the present invention is arbitrarily set according to the type of the dried material.

When the internal heating device (41) is formed into a large shape, the radiation surface (43) is close to the dried material (47) and the radiation surface (43) can be larger to release much radiation heat, thereby enabling the sublimation heat to be rapidly supplied. In addition, the space in the vertical tube (2) becomes smaller, which is preferable because the interior area of the vertical tube (2) is easily put into a state of vacuum by the pressure-reduction device (12) to maintain this state.

After the freeze-drying procedures are completed, the ice lining (46) formed on the inner circumferential surface of the vertical tube (2) is sublimated and disappears, with the result that the freeze-dried product (47) scrapes off from the inner circumferential surface of the vertical tube (2) due to vibration of motor driving in its lower portion and purposely applied vibration, and falls down within the guide cylinder (14) to be received by the rotating blade (16) of the roughly crushing device (15).

Next, the pressure-reduction device (12) is stopped to close the pressure-reduction passage open-close valve (13). Further, the first open-close valve (18) provided in the guide cylinder (14) is opened to return the interior area of the vertical tube (2) and the interior area of the guide cylinder (14) to the atmospheric pressure. Then the motor (17) is driven to rotate the rotating blade (16), thereby applying an impact to the freeze-dried product (47) for crushing the same. At this time, it suffices if the freeze-dried product (47) is roughly crushed to a degree enough to pass through the lower smaller-diameter portion (14c) of the guide cylinder (14), and the freeze-dried product need not be crushed to an excessively fine state.

The product roughly crushed by the rotating blade (16) passes through the decreasing-diameter portion (14b) and the smaller-diameter portion (14c) in order and is guided to the crushing-granulating device (22) under the action of gravity to be finely crushed by the crushing arm (25), and passes through the screen (26) to be granulated to a predetermined particle degree.

The particles granulated by the crushing-granulating device (22) are guided within the second guide cylinder (31) under the action of gravity and are thrown into the funnel (32) of the powder filling device (28). The particles are agitated by the agitating arm (34) within the funnel (32) and a predetermined amount of the particles is metered by the metering portion (38) at the lower end of the funnel (32) in correspondence with the rotation of the auger screw (33), sent out downwards from the metering portion (38) and filled into the predetermined container (39).

In the above embodiment, the crushing-granulating device (22) and the powder filling device (28) are arranged in order below the freeze-drying apparatus so that the freeze-drying and powder filling can be processed in series. However, the freeze-drying apparatus of the present invention may not have the powder filling device and the crushing-granulating device connected thereto below the freeze-drying apparatus. For example, when the powder filling device is omitted, a recovering container such as a bulk can is arranged below the second guide cylinder of the crushing-granulating device, and crushed and granulated powders are accommodated in the recovering container to be transported to, e.g., an additionally provided powder filling process. In addition, when the crushing-granulating device is omitted, the recovering container is arranged below the guide cylinder of the freeze-drying apparatus, and a roughly crushed product after freeze-drying is accommodated in the recovering container to be transported to the next process.

The freeze-drying apparatus described in the above embodiment is illustrated only by way of example so as to embody the technical idea of the present invention, and the structure, the shape, the arrangement and the like of each of the vertical tube, the internal heating means, the liquid-supply means, the spray device, the freezing means, the pressure-reduction means, the liquid-recovery passage, the roughly crushing means, and other members are not limited to those of the above embodiment. Various changes can be made as far as they fall within the scope of claims of the present invention, and needless to say, the frozen thickness of the dried material is not limited to a specific dimension.

For example, in the above embodiment, since the ice lining is formed by purified water prior to the supply of the dried material onto the frozen surface, the freeze-dried product is scraped off from the inner circumferential surface of the vertical tube and falls down upon completion of freeze-drying procedure. However, according to the present invention, if the freeze-dried product of the dried material is easily scraped off from the inner circumferential surface of the vertical tube, it is possible to remove the formation of the frozen ice layer by the purified water.

In addition, in the above embodiment, the internal heating device having a double-pipe configuration is used, but in the present invention, a helical heating medium flow passage may also be used, and a heat source such as an electric heater other than a fluid can also be used. The shape of the radiation surface is preferably circular-cylindrical, which, of course, is not limited thereto.

Further, in the above embodiment, the freezing means serves as the external heating device. In the present invention, apart from the freezing means, an external heating device may also be provided, and when sublimation heat can be sufficiently supplied from the internal heating means, the external heating means can also be omitted.

In the above embodiment and modification examples, the freeze-dried material is guided by the guide cylinder and is roughly crushed. However, for example, a jet nozzle may be incorporated into the lower portion of the vertical tube to roughly crush the freeze-dried material by injected air, or alternatively, other roughly crushing device may be incorporated.

In addition, in the above embodiment, the crushing-granulating device, the mixing-feeding device and the powder filling device are disposed and connected to a portion below the freeze-drying apparatus. However, the freeze-drying apparatus of the present invention may have only the crushing-granulating means connected thereto or may omit such connections. In this case, it is possible to transport the roughly crushed product or the granulated powder particles by the bulk can or the like.

INDUSTRIAL APPLICABILITY

A freeze-drying apparatus of the present invention can freeze a liquid dried material to efficiently freeze-dry the frozen dried material in a short time and can significantly increase production efficiency. Accordingly, the freeze-drying apparatus of the present invention is particularly suitably used for producing a freeze-dried powder of a pharmaceutical product and freeze-dried powders in other fields.

The invention claimed is:

1. A freeze-drying method comprising:
   supplying a liquid material to be dried (47) from liquid-supply means (5) onto a frozen surface (2a) formed on an inner circumferential surface of a vertical tube (2);
   cooling the frozen surface (2a) to freeze the dried material (47) into a pipe-shape;
   subsequently stopping the supply of the dried material (47) from the liquid-supply means (5); and
   then reducing a pressure within the vertical tube (2) to freeze-dry the frozen dried material (47), wherein
   upon the freeze-drying, radiation heat is supplied from internal heating means (41) arranged in the vertical tube (2) to the frozen dried material (47).

2. The freeze-drying method according to claim 1, wherein the internal heating means (41) is arranged in the vertical tube (2) along a center axis thereof, and has an outer surface formed with a vertically long radiation surface (43).

3. A freeze-drying apparatus comprising a vertical tube (2) having an inner circumferential surface formed with a frozen surface (2a), liquid-supply means (5) for supplying a liquid material to be dried (47) onto the frozen surface (2a), freezing means (10) arranged around the vertical tube (2) and intended for cooling the frozen surface (2a), and pressure-reduction means (12) which puts an interior area of the vertical tube (2) into a state of vacuum, wherein
   the vertical tube (2) has internal heating means (41) therein, and the internal heating means (41) is capable of supplying radiation heat onto the frozen surface (2a) side.

4. The freeze-drying apparatus according to claim 3, wherein
   the internal heating means (41) is arranged in the vertical tube (2) along a center axis thereof, and has an outer surface formed with a vertically long radiation surface (43).

* * * * *